(12) United States Patent
Ing

(10) Patent No.: US 7,649,807 B2
(45) Date of Patent: Jan. 19, 2010

(54) METHOD FOR LOCATING AN IMPACT ON A SURFACE AND DEVICE FOR IMPLEMENTING SUCH A METHOD

(75) Inventor: Ros Kiri Ing, Paris (FR)

(73) Assignee: Sensitive Object, Boulogne-Billancourt (FR)

( * ) Notice: Subject to any disclaimer, the term of this patent is extended or adjusted under 35 U.S.C. 154(b) by 23 days.

(21) Appl. No.: 11/573,513

(22) PCT Filed: Aug. 10, 2005

(86) PCT No.: PCT/EP2005/009891

§ 371 (c)(1), (2), (4) Date: Jan. 25, 2008

(87) PCT Pub. No.: WO2006/015888

PCT Pub. Date: Feb. 16, 2006

(65) Prior Publication Data

US 2009/0116339 A1    May 7, 2009

(30) Foreign Application Priority Data

Aug. 11, 2004 (FR) .................................. 04 08826

(51) Int. Cl.
*G06F 3/043* (2006.01)
*G01S 3/80* (2006.01)

(52) U.S. Cl. .................................................. 367/118
(58) Field of Classification Search ................ 367/118, 367/125; 345/156, 157, 158, 173, 177
See application file for complete search history.

(56) References Cited

U.S. PATENT DOCUMENTS

| 7,345,677 | B2 * | 3/2008 | Ing et al. .................. 345/177 |
| 7,511,711 | B2 * | 3/2009 | Ing et al. .................. 345/173 |
| 2004/0160421 | A1 | 8/2004 | Sullivan |
| 2004/0173389 | A1 | 9/2004 | Sullivan |
| 2005/0083313 | A1 | 4/2005 | Hardie-Bick |
| 2005/0174338 | A1 | 8/2005 | Ing et al. |
| 2005/0212777 | A1 | 9/2005 | Ing et al. |
| 2007/0085821 | A1 * | 4/2007 | Ing .......................... 345/156 |

FOREIGN PATENT DOCUMENTS

| WO | 03/005292 | 1/2003 |
| WO | 03/067511 | 8/2003 |
| WO | 03/107261 | 12/2003 |

* cited by examiner

*Primary Examiner*—Dan Pihulic
(74) *Attorney, Agent, or Firm*—Occhiuti Rohlicek & Tsao LLP

(57) ABSTRACT

Method for locating an impact on a surface (9), in which acoustic sensors (6) pick up acoustic signals $s_{ki}(t)$ generated by the impact and the impact is located by calculating, for a number of reference points of index j, a validation parameter representative of a function: $PROD_{kj\ 1\ 2}^{i\ i\ \cdots\ i}{}_{2P}(\omega) = \phi S_{ki1}(\omega) \phi R_{ji1}(\omega) * \phi S_{ki2}(\omega) * \phi R_{ji2}(\omega) \ldots \phi S_{ki2p}(\omega) * \phi R_{ji2p}(\omega)$ where: $\phi S_{ki}(\omega)$ and $\phi R_{ji}(\omega)*$ are complex phases of $S_{ki}(\omega)$ and of $R_{ji}(\omega)$, for $i=i_1, i_2, \ldots, i_{2p}$, indices denoting sensors, $S_{ki}(\omega)$ and $R_{ji}(\omega)$ being the Fourier transform of $s_{ki}(t)$ and $r_{ji}(t)$, $r_{ji}(t)$ being a reference signal corresponding to the sensor i for an impact at the reference point j, p being a non-zero integer no greater than $N_{SENS}/2$.

17 Claims, 1 Drawing Sheet

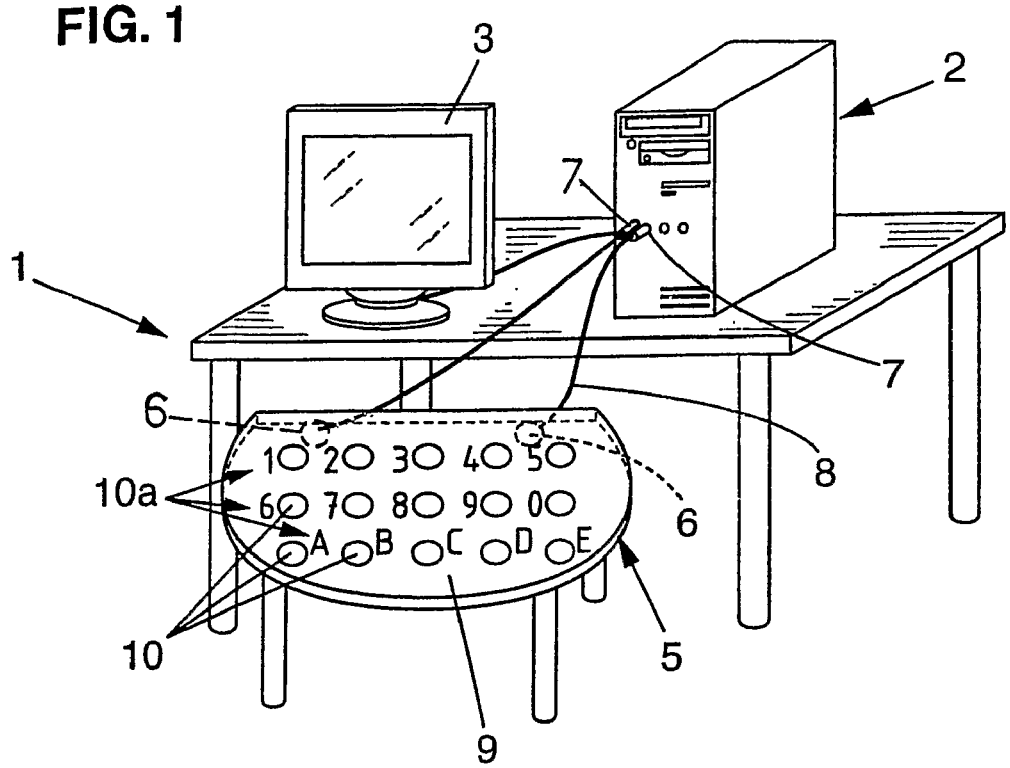
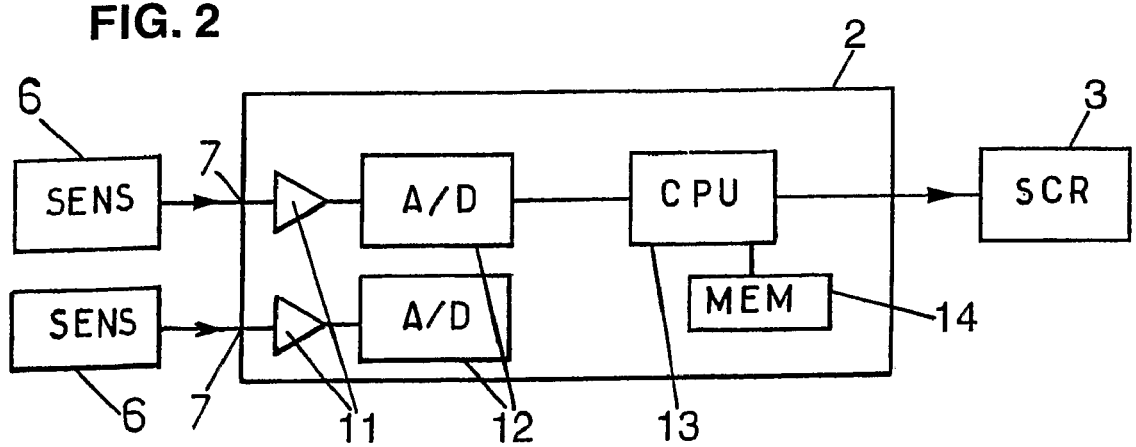

METHOD FOR LOCATING AN IMPACT ON A SURFACE AND DEVICE FOR IMPLEMENTING SUCH A METHOD

CROSS-REFERENCE TO RELATED APPLICATIONS

This application is the National Stage of International Application No. PCT/EP2005/009891, filed Aug. 10, 2005, which claims the benefit of French Patent Application Serial No. 0408826, filed on Aug. 11, 2004. The contents of both applications are hereby incorporated by reference in their entirety.

The present invention relates to the methods for locating an impact on a surface and to the devices for implementing such methods.

More particularly, the invention relates to a method in which an impact is located on a surface belonging to an object provided with at least $N_{SENS}$ acoustic sensors (the object forming the acoustic interface can be made of a single piece or of several items, joined together or at least in mutual contact), $N_{SENS}$ being a natural integer at least equal to 2, method in which:
- $N_{SENS}$ signals $s_{ki}(t)$ from acoustic waves generated in the object by said impact are respectively sensed by the sensors, i being an index between 1 and $N_{SENS}$ which denotes the corresponding sensor,
- for each reference point of index j, at least one validation parameter representative of at least one intercorrelation of complex phases representative of said signals $s_{ki}(t)$ and of reference signals $r_{ji}(t)$ is calculated, each reference signal $r_{ji}(t)$ corresponding to the signal that would be received by the sensor i in case of impact at a reference point j out of $N_{REF}$ reference points belonging to said surface, $N_{REF}$ being a natural integer at least equal to 1 and j being an index between 1 and $N_{REF}$,
- and the impact is located by determining at least one reference point as close as possible to the point of impact, by applying at least one validation criterion to the validation parameter.

Document WO-A-03/107261 describes an example of such a method which already gives total satisfaction. The main object of the present invention is to further refine this method, in particular to obtain an even more stable and more reliable signal processing.

To this end, according to the invention, a method of the type concerned is characterized in that said validation parameter is representative of at least one intercorrelation:

$$PROD_{kj}^{i_1 i_2 \cdots i_{2p}}(\omega) = \phi S_{ki1}(\omega)\phi R_{ji1}(\omega)^*\phi S_{ki2}(\omega)^*\phi R_{ji2}(\omega) \cdots \phi S_{ki2p}(\omega)^*\phi R_{ji2p}(\omega)$$

where:
- $\phi S_{ki}(\omega)$ is the complex phase of $S_{ki}(\omega)$, for $i=i_1, i_2, \ldots, i_{2p}$,
- $\phi R_{ji}(\omega)$ is the complex phase of $R_{ji}(\omega)$, for $i=i_1, i_2, \ldots, i_{2p}$,
- \* denotes the conjugate operator, applied to $\phi S_{ki}(\omega)$ for $i=i_{2m}$ and to $\phi R_{ji}(\omega)$ for $i=i_{2m-1}$, m being an integer between 1 and p;
- $S_{ki}(\omega)$ is the Fourier transform of $s_{ki}(t)$,
- $R_{ji}(\omega)$ is the Fourier transform of $r_{ji}(t)$,
- p is a non-zero natural integer less than or equal to $N_{SENS}/2$,
- $i_1, i_2, \ldots i_{2p}$ are 2p indices denoting 2p sensors, each between 1 and $N_{SENS}$.

With these provisions, an impact positioning method is obtained which is particularly reliable, in particular because the abovementioned intercorrelation is independent of the type of impact and of the response from the sensors.

In various embodiments of the invention, there may, if necessary, be used also one and/or other of the following provisions:
- the method includes a step for calculating the intercorrelation $PROD_{kj}^{i_1 i_2 \cdots i_{2p}}(\omega)$, then a step for the inverse Fourier transform of this intercorrelation to obtain a time function $PROD_{kj}^{i_1 i_2 \cdots i_{2p}}(t)$ from which said validation parameter is then calculated;
- the intercorrelation $PROD_{kj}^{i_1 i_2 \cdots i_{2p}}(\omega)$ is standardized before proceeding with the inverse Fourier transform;
- for each reference point j, a resemblance function $V_{kj}(t)$ is calculated, chosen from:
  $prod_{kj}^{i_1 i_2 \cdots i_{2p}}(t)$,
  and a linear combination of a number of functions $prod_{kj}^{i_1 i_2 \cdots i_{2p}}(t)$ corresponding to a number of subsets of 2p sensors out of $N_{SENS}$;
- $N_{SENS}$ is an even number and $V_{kj}(t)$ is proportional to $prod_{kj}^{i_1 i_2 \cdots i_{2p}}(t)$, where $p=N_{SENS}/2$;
- $N_{SENS}=3$ and, for each reference point j, a resemblance function $V_{kj}(t)$ is calculated, chosen from:

$V_{kj}(t) = a3 \cdot [prod_{kj}^{12}(t) + prod_{kj}^{23}(t)]$, and $V_{kj}(t) b3 \cdot [prod_{kj}^{12}(t) + prod_{kj}^{23}(t) + prod_{kj}^{13}(t)]$, a3 and b3 being constants;
  $a3=\frac{1}{2}$ and $b3=\frac{1}{3}$;
- $N_{SENS}=4$ and, for each reference point j, a resemblance function $V_{kj}(t)$ is calculated, chosen from:

$V_{kj}(t) = a4 \cdot prod_{kj}^{1234}(t)$, $V_{kj}(t) = b4 \cdot [prod_{kj}^{12}(t) + prod_{kj}^{34}(t)]$, $V_{kj}(t) = c4 \cdot [prod_{kj}^{12}(t) + prod_{kj}^{23}(t) + prod_{kj}^{34}(t) + prod_{kj}^{14}(t)]$, a4, b4 and c4 being constants;
  $a4=1$, $b4=\frac{1}{2}$ and $c4=\frac{1}{4}$;
- the validation parameter is chosen from:

$MAXIMUM_{0j} = |V_{kj}(t=0)|$, $MAXIMUM_{1j} = \text{Max}(|V_{kj}(t)|)$, $CONTRAST_{1j} = \dfrac{\text{Max}(MAXIMUM_{0j})}{(\Sigma_j MAXIMUM_{1j} - \text{Max}(MAXIMUM_{1j}))/(N_{REF}-1)}$ $ENERGY = \Sigma_i(\Sigma_t[S_{ki}(t)]^2)$;

- only $V_{kj}(t)$ is calculated for the time $t=0$ roughly corresponding to the impact, as being the real part of $PROD_{kj}^{i_1 i_2 \cdots i_{2p}}(\omega)$, and $MAXIMUM_{0j}$ is used as validation parameter;
- at least one validation criterion is used, chosen from the following criteria:
  $CONTRAST_{1j} > THRESHOLD_1$, with $THRESHOLD_1 > 1$,
  $CONTRAST_{1j} > THRESHOLD_1$ and $MAXIMUM_{0j}/MAXIMUM_{1j}^{NOISE} > THRESHOLD_2$, where $THRESHOLD_2 > 1$ and $MAXIMUM_{1j}^{NOISE}$ corresponds to the parameter $MAXIMUM_{1j}$ of the signals processed previously and not having resulted in validation,
  $MAXIMUM_{0j} > THRESHOLD_3$, with $THRESHOLD_3 > 0$ and $MAXIMUM_{0j}/MAXIMUM_{0j}^{NOISE} > THRESHOLD_4$ with $THRESHOLD_4 > 1$, where $MAXIMUM_{0j}^{NOISE}$ corresponds to the parameter MAXIMUM$_{0j}$ of the signals processed previously and not having resulted in validation, MAXIMUM$_{0j}$/Average(MAXIMUM$_{0j}{}^{NOISE}$)>THRESHOLD$_5$, with THRESHOLD$_5$>1, ENERGY/ENERGY$^{NOISE}$>THRESHOLD$_6$, where THRESHOLD$_6$>1 and ENERGY$^{NOISE}$ corresponds to the parameter ENERGY of the signals processed previously and not having resulted in validation;

the reference signals are predetermined theoretically;

the reference signals are used with said object without training phase;

the reference signals are previously learned on a reference device identical to said object, then are used with said object without training phase.

Moreover, the invention also relates to a device specially adapted to implement a method as defined above.

Other characteristics and advantages of the invention will become apparent from the following description of one of its embodiments, given by way of non-limiting example, in light of the appended drawings.

In the drawings:

FIG. 1 is a perspective diagrammatic view showing an exemplary device comprising an acoustic interface designed to implement a method according to an embodiment of the invention, and FIG. 2 is a block diagram of the device of FIG. 1.

In the different figures, the same references denote identical or similar elements.

FIG. 1 represents a device 1 designed to implement the present invention, which includes, for example:

a microcomputer central processing unit 2, a screen 3 linked to the central processing unit 2, and a solid object 5 on which the central processing unit 2 can identify the position of an impact, as will be explained below.

The object 5 can be of any type (table, shelf, window pane, wall, door, window, computer screen, display panel, interactive terminal, toy, vehicle dashboard, seat back, floor, vehicle shock absorber, etc.) in which acoustic waves (in particular Lamb waves) can be made to propagate by generating impacts on its surface 9, as will be explained below.

At least two acoustic sensors 6 are fixed to the object 5 and are linked, for example, to microphone inputs 7 of the central processing unit 2, via cables 8 or by any other transmission means (radio, infrared or other), so that said acoustic waves can be captured and transmitted to the central processing unit 2. The term N$_{SENS}$ will hereinafter be used to denote the number of sensors and each sensor will be identified by an index from 1 to N$_{SENS}$.

The acoustic sensors 6 can be, for example, piezo-electric sensors, or others (for example, capacitive sensors, magnetostrictive sensors, electromagnetic sensors, acoustic velocimeters, optical sensors [laser interferometers, laser vibrometers, etc.], etc.). They can be designed to measure, for example, the amplitudes of the movements due to the propagation of the acoustic waves in the object 5, or even the speed or the acceleration of such movements, or there may even be a pressure sensor measuring the pressure variations due to the propagation of the acoustic waves in the object 5.

To enable the central processing unit 2 to locate an impact on the surface 9, the signals received by the sensors i when an impact is generated at a certain number N$_{REF}$ of reference points 10 (each identified by an index j from 1 to N$_{REF}$) on the surface 9 are first of all determined. In the example represented in FIG. 1, the surface 9 forms an acoustic interface in keyboard form, and the areas forming the reference points 10 can, if necessary, be marked by markings delimiting these areas and the information associated with them.

To this end, the first stage of the method can be a training step during which impacts are generated at reference points j of the surface 9.

These impacts can be generated, for example, by successively exciting the reference points j with any tool (including a part of the human body, such as a nail), advantageously a tool, the contact surface of which remains constant in time. The force of the impact is, for example, perpendicular to the surface 9 or oriented in a constant direction.

On each impact, the impulse responses are detected by the sensors 6 and stored by the central processing unit 2 to form a bank of so-called reference signals, denoted r$_{ji}$(t) (reference signal detected by the sensor numbered i for an excitation of the reference point numbered j). There are N$_{SENS}$·N$_{REF}$ of these reference signals.

As a variant, the reference signals are predetermined theoretically, and, where appropriate, then used with said object 5 without training phase.

According to another variant, the reference signals can be learned previously on a reference device identical to said object 5, then, where appropriate, are used with said object 5 without learning phase.

The reference signals r$_{ji}$(t) can be expressed as follows:

$$r_{ji}(t) = e_j(t) * h_{ji}(t) * m_i(t) \quad (1)$$

With:

e$_j$(t) time function of the excitation force, h$_{ji}$(t) impulse response (Green's function) for a force applied to the point j and detected by the sensor i, m$_i$(t) impulse response of the sensor i,

* symbol representing the time convolution operator.

By switching to the frequency domain, the equation (1) becomes:

$$R_{ji}(\omega) = E_j(\omega) H_{ji}(\omega) M_i(\omega) \quad (2)$$

With:

E$_j$(ω): Fourier transform of e$_j$(t)

H$_{ji}$(ω): Fourier transform of h$_{ji}$(t)

M$_i$(ω): Fourier transform of m$_i$(t)

After the training step, the device 1 is used to locate any impact at a point numbered k of the surface 9. The N$_{SENS}$ signals newly detected by the sensors i, denoted s$_{ki}$(t) are then compared with the reference signals r$_{ji}$(t) stored previously, so as to determine whether the point of impact k corresponds to a known reference point j.

To this end, S$_{ki}$(ω), the N$_{SENS}$ Fourier transforms of the signals s$_{ki}$(t) are determined first of all, then the products M$_{kji}$ of the exponential phases of the new signals S$_{ki}$(ω) with the phases of the signals R$_{ji}$(ω)* are then determined (the index i corresponds to the number of the sensor and the * sign indicates the conjugate complex). To simplify the notation, the prefix φ will be used below to indicate the exponential phase of a complex variable, for example: φS$_{ki}$(ω) is the exponential phase of S$_{ki}$(ω) and φR$_{ji}$(ω) is the exponential phase of R$_{ji}$(ω).

Each product M$_{kji}$ can therefore be written:

$$M_{kji}(\omega) = \phi S_{ki}(\omega) \phi R_{ji}(\omega)^* \quad (3)$$

If S$_{ki}$(ω) and R$_{ji}$(ω) are broken down according to the equation (2):

$$S_{ki}(\omega) = E_k(\omega) H_{ki}(\omega) M_1(\omega)$$

and $R_{ji}(\omega) = E_j(\omega) H_{ji}(\omega) M_1(\omega)$

Hence:

$$M_{kji}(\omega) = \phi E_k(\omega)\phi H_{ki}(\omega)\phi M_i(\omega)\phi E_j(\omega)^* \phi H_{ji}(\omega)^* \phi M_i(\omega)^* \quad (3')$$

One or more correlation products $PROD_{kj}^{i_1 i_2 \cdots i_{2p}}(\omega)$ are then calculated, respectively by correlation of an even number 2p of signals $M_{kji}(\omega)$ originating from 2p sensors $i_1, i_2, \ldots i_{2p}$ out of the $N_{SENS}$ sensors (p is an integer from 1 to $N_{SENS}/2$):

$$PROD_{kj}^{i_1 i_2 \cdots i_{2p}}(\omega) = M_{kji1}(\omega) M_{kji2}(\omega)^* \ldots M_{kji2p}(\omega)^* \quad (4)$$

It will be noted that the conjugation operator * is applied to $M_{kji}(\omega)\phi S_{ki}(\omega)$ with $i = i_{2m}$, m being an integer between 1 and p.

If the formula (4) is developed, given that:

$$\phi E_k(\omega)\phi E_k(\omega)^* \phi E_j(\omega)\phi E_j(\omega)^* = 1$$

and $\phi M_1(\omega)\phi M_1(\omega)^* \phi M_2(\omega)\phi M_2(\omega)^* = 1$, we obtain:

$$PROD_{kj}^{i_1 i_2 \cdots i_{2p}}(\omega) = \phi H_{ji1}(\omega)^* \phi H_{ki1}(\omega)\phi H_{ji2}(\omega) \\ \phi H_{ki2}(\omega) \ldots \phi H_{j2p}(\omega)^* \phi H_{k2p}(\omega) \quad (4')$$

It can be noted that $PROD_{kj}^{i_1 i_2 \cdots i_{2p}}(\omega)$ does not depend on the type of excitation or on the response of the sensors, which makes it an extremely interesting variable in comparing the signal received from the impact at the point k with the reference signals of the signal bank, in order to determine the position of the point k.

The $PROD_{kj}^{i_1 i_2 \cdots i_{2p}}(\omega)$ value or values can be standardized, for example as follows:

$$PROD_{kj}^{i_1 i_2 \cdots i_{2p} N}(\omega) = (N_{pts}/I^{kji}_{1 2 \cdots 2p}) \cdot PROD_{kj}^{i_1 i_2 \cdots i_{2p}}(\omega) \quad (5)$$

Where:

$PROD_{kj}^{i_1 i_2 \cdots i_{2p} N}(\omega)$ is the standardized value of $PROD_{kj}^{i_1 i_2 \cdots i_{2p}}(\omega)$, $N_{pts}$ is the duration of the time signals $s_{ki}(t)$ and $r_{ji}(t)$ picked up by the sensors 6 and stored by the central processing unit 2, that is, the number of points of each of these signals after sampling and digitization, $$I^{kji}_{1 2 \cdots 2p} = \Sigma_\omega |PROD_{kj}^{i_1 i_2 \cdots i_{2p}}(\omega)| \quad (6)$$

($I^{kji}_{1 2 \cdots 2p}$ is the integral of $|PROD_{kj}^{i_1 i_2 \cdots i_{2p}}(\omega)|$ over the frequencies).

It will be noted that the standardized value can, if necessary, be calculated directly, without separately determining $PROD_{kj}^{i_1 i_2 \cdots i_{2p}}(\omega)$.

The next step is to return to the time domain by calculating the inverse Fourier transform of $PROD_{kj}^{i_1 i_2 \cdots i_{2p}}(\omega)$, or $prod_{kj}^{i_1 i_2 \cdots i_{2p}}(t)$.

To determine whether the point k corresponds to one of the reference points $j_0$, resemblance functions $V_{kj}(t)$ are used, which can, depending on case, be equal (or more generally proportional) respectively to:

$prod_{kj}^{i_1 i_2 \cdots i_{2p}}(t)$, or a linear combination (in particular an average) of a number of functions $prod_{kj}^{i_1 i_2 \cdots i_{2p}}(t)$ corresponding to a number of subsets of 2p sensors.

As an example, for $N_{SENS}=2$ sensors, the resemblance functions $V_{kj}(t)$ are equal (or more generally proportional) respectively to $prod_{kj}^{12}(t)$ ($i_1=1, i_2=2$ and p=1).

For $N_{SENS}=3$ sensors, the resemblance functions $V_{kj}(t)$ can be chosen to be equal (or more generally proportional) respectively to:

either $\frac{1}{2} \cdot [prod_{kj}^{12}(t) + prod_{kj}^{23}(t)]$ (respectively $i_1=1, i_2=2$ and p=1 for $prod_{kj}^{12}(t)$, $i_1=2, i_2=3$ and p=1 for $prod_{kj}^{23}(t)$), or $\frac{1}{3} \cdot [prod_{kj}^{12}(t) + prod_{kj}^{23}(t) + prod_{kj}^{13}(t)]$ (respectively $i_1=1, i_2=2$ and p=1 for $prod_{kj}^{12}(t)$, $i_1=2, i_2=3$ and p=1 for $prod_{kj}^{23}(t)$, $i_1=1, i_2=3$ and p=1 for $prod_{kj}^{13}(t)$).

For $N_{SENS}=4$ sensors, the resemblance functions $V_{kj}(t)$ can be chosen to be equal (or more generally proportional) respectively to:

$prod_{kj}^{1234}(t)$ ($i_1=1, i_2=2, i_3=3, i_4=4$ and p=2), or $\frac{1}{2} \cdot [prod_{kj}^{12}(t) + prod_{kj}^{34}(t)]$ (respectively $i_1=1, i_2=2$ and p=1 for $prod_{kj}^{12}(t)$, $i_1=3, i_2=4$ and p=1 for $prod_{kj}^{34}(t)$), or $\frac{1}{4} \cdot [prod_{kj}^{12}(t) + prod_{kj}^{23}(t) + prod_{kj}^{34}(t) + prod_{kj}^{14}(t)]$ (respectively $i_1=1, i_2=2$ and p=1 for $prod_{kj}^{12}(t)$, $i_1=2, i_2=3$ and p=1 for $prod_{kj}^{23}(t)$, $i_1=3, i_2=4$ and p=1 for $prod_{kj}^{34}(t)$, $i_1=1, i_2=4$ and p=1 for $prod_{kj}^{14}(t)$).

For a number of sensors greater than 4, the procedure is similar to the cases described above, as explained previously, by calculating the functions $V_{kj}(t)$ as being equal (or more generally proportional) respectively to:

$prod_{kj}^{i_1 i_2 \cdots i_{2p}}(t)$ (in particular if $N_{SENS}=2p$, and $i_1=1, i_2=2, i_3=3, \ldots, i_{2p}=N_{SENS}$), or a linear combination of a number of functions $prod_{kj}^{i_1 i_2 \cdots i_{2p}}(t)$ corresponding to a number of subsets of 2p sensors out of $N_{SENS}$: in particular, $V_{kj}(t)$ can be equal (or more generally proportional) to 1/n times the sum of n functions $prod_{kj}^{i_1 i_2 \cdots i_{2p}}(t)$ corresponding to n different subgroups of 2p sensors out of $N_{SENS}$, each sensor i preferably being included at least once in these subgroups.

In these different examples, each resemblance function $V_{kj}(t)$ is between −1 and 1.

With the resemblance functions determined, these functions are used to calculate one or more validation parameters.

As an example, one or more of the following validation parameters can be calculated:

$$MAXIMUM_{0j} = |V_{kj}(t=0)|,$$

$$MAXIMUM_{1j} = \text{Max}(|V_{kj}(t)|)$$

$$CONTRAST_{1j} = \frac{\text{Max}(MAXIMUM_{0j})}{(\Sigma_j MAXIMUM_{1j} - \text{Max}(MAXIMUM_{1j}))/(N_{REF}-1)}$$

$$ENERGY = \Sigma_i(\Sigma_t [S_{ki}(t)]^2).$$

Thus, it is possible to validate an impact located at the point k and confirm that it is located at a reference point j0, for example, if it satisfies at least one of the following groups of criteria:

1) Group 1:

The impact k is considered located at the point j0 if: $CONTRAST_{1j0} > CONTRAST_{1j}$ for j different from $j_0$ and $CONTRAST_{1j0} > THRESHOLD_1$, with $THRESHOLD_1 > 1$, for example $THRESHOLD_1=2$.

2) Group 2:

The impact k is considered located at the point j0 if $CONTRAST_{1j0} > CONTRAST_{1j}$ for j different from $j_0$ and $CONTRAST_{1j0} > THRESHOLD_1$ and $MAXIMUM_{0j0}/MAXIMUM_{1j0}^{NOISE} > THRESHOLD_2$ where $THRESHOLD_2>1$, for example $THRESHOLD_2=2$, and $MAXIMUM_{1j0}^{NOISE}$ corresponds to the parameter $MAXIMUM_{1j0}$ (averaged or not) of the signals processed previously and not having resulted in validation. This criterion avoids validating noise or random successive impacts on the object 5.

3) Group 3:

The impact k is considered located at the point j0 if $MAXIMUM_{0j0}>MAXIMUM_{0j}$ for j different from $j_0$ and $MAXIMUM_{0j0}>THRESHOLD_3$, with $THRESHOLD_3>0$, for example $THRESHOLD_3$ 0.5, and $MAXIMUM_{0j0}/MAXIMUM_{0j0}^{NOISE}>THRESHOLD_4$ with $THRESHOLD_4>1$, for example $THRESHOLD_4=2$.

$MAXIMUM_{0j0}^{NOISE}$ corresponds to the parameter $MAXIMUM_{0j0}$ (averaged or not) of the signals processed previously and not having resulted in validation.

Furthermore, for refinement purposes, the following criterion can be added:

$$MAXIMUM_{0j0}/Average(MAXIMUM_{0j0}^{NOISE})>THRESHOLD_5 \quad (7)$$

with $THRESHOLD_5>1$, for example $THRESHOLD_5=4$

In addition to these criteria, the following energy criterion can also be added:

$$ENERGY/ENERGY^{NOISE}>THRESHOLD_6 \quad (8)$$

where $THRESHOLD_6>1$, for example $THRESHOLD_6=2$ and $ENERGY^{NOISE}$ corresponds to the parameter ENERGY (averaged or not) of the signals processed previously and not having resulted in validation.

As an example, it is therefore possible to validate a point of impact k and determine that it corresponds to a reference point j0 by using one of the following combinations of criteria and groups of criteria:
(group 1),
(group 2),
(group 3),
(group 1) or (group 2),
(group 2) or (group 3),
(group 1) or (group 3),
(group 1) or (group 2) or (group 3),
(group 1) and (7),
(group 2) and (7),
(group 3) and (7),
[(group 1) or (group 2)] and (7),
[(group 2) or (group 3)] and (7),
[(group 1) or (group 3)] and (7),
[(group 1) or (group 2) or (group 3)] and (7),
(group 1) and (8),
(group 2) and (8),
(group 3) and (8),
[(group 1) or (group 2)] and (8),
[(group 2) or (group 3)] and (8),
[(group 1) or (group 3)] and (8),
[(group 1) or (group 2) or (group 3)] and (8),
(group 1) and (7) and (8),
(group 2) and (7) and (8),
(group 3) and (7) and (8),
[(group 1) or (group 2)] and (7) and (8),
[(group 2) or (group 3)] and (7) and (8),
[(group 1) or (group 3)] and (7) and (8),
[(group 1) or (group 2) or (group 3)] and (7) and (8).

The central processing unit 2 can thus locate the point of impact k on the surface 9 of the object 5. The determination of this point of impact may, if necessary, be the only information sought by the central processing unit, or it may even, if necessary, be used by said central processing unit 2 to deduce other information from it, for example a predetermined item of information assigned to a location on the surface 9 (the surface 9 can thus constitute an acoustic keypad). Said information assigned to a location on the surface 9 can be predetermined information assigned in advance to said location, or even information determined dynamically on each new impact on the surface 9, according to impacts previously detected.

It will be noted that, when the parameter $MAXIMUM_{0j}$ is used to validate the impacts, for example when the (group 3) is used as the validation criterion, it is possible to calculate values approximating to $MAXIMUM_{0j}$ very simply and quickly. In practice, when k is equal to j, terms of type $\phi H_{j1}(\omega)^* \phi H_{k1}(\omega)$ of the equation (4') are purely real. Now, simply summing the real part of the product $PROD_{kj\ 1\ 2}^{i\ i\ \cdots\ i}{}_{2p}(\omega)$ amounts to calculating the inverse Fourier transform of the equation (4') at the time t=0.

According to this variant, the real part of each product $PROD_{kj\ 1\ 2}^{i\ i\ \cdots\ i}{}_{2p}(\omega)$ is therefore calculated, which gives a value approximating to the value of $prod_{kj\ 1\ 2}^{i\ i\ \cdots\ i}{}_{2p}(t)$ at t=0. From this, the value of $V_{kj}(0)$ is then deduced as explained previously, which gives the value of the parameter $MAXIMUM_{0j}$, then the or each required validation criterion, for example the abovementioned group 3, is applied.

With this variant, the calculation load is far less and continuous monitoring is much more easily possible, even with a large number of reference points.

Moreover, the point of impact k on the surface 9 can be positioned, even when it is not on one of the reference points, by interpolation, as explained in the abovementioned document WO-A-03/107261.

Moreover, the reference signals can theoretically be modelled and applied to real objects, the acoustic characteristics of which are the same as those of the object concerned and used in the modelling.

The reference signals learned or theoretically modelled can be applied without training phase to objects having acoustic characteristics identical to those of the object used for training the reference signals or considered and used in the modelling.

The invention claimed is:

1. Method for locating an impact on a surface belonging to an object provided with at least $N_{SENS}$ acoustic sensors, $N_{SENS}$ being a natural integer at least equal to 2, said method being implemented by a central processing unit linked to said acoustic sensors and in which method:

the sensors are made to pick up respectively $N_{SENS}$ signals $S_{ki}(t)$ from acoustic waves generated in the object by said impact, i being an index between 1 and $N_{SENS}$ which denotes the corresponding sensor, where k is the area where the impact occurred there is calculated, for each reference point of index j, at least one validation parameter representative of at least one intercorrelation of complex phases representative of said picked up signals $S_{ki}(t)$ and of reference signals $r_{ji}(t)$, each reference signal $r_{ji}(t)$ corresponding to the signal that would be received by the sensor i in case of impact at a reference point j out of $N_{REF}$ reference points belonging to said surface, $N_{REF}$ being a natural integer at least equal to 1 and j being an index between 1 and $N_{REF}$, and the impact is located by determining at least one reference point as close as possible to the point of impact, by applying at least one validation criterion to the validation parameter, characterized in that said validation parameter is representative of at least one intercorrelation:

$$\text{PROD}_{kj}^{i_1 i_2 i_{2p}}(\omega) = \phi S_{ki1}(\omega)\phi R_{ji1}(\omega)^* \phi S_{ki2}(\omega)^* \phi R_{ji2}(\omega) \ldots \phi S_{ki2p}(\omega)^* \phi R_{ji2p}(\omega)$$

where:

$\phi S_{ki}(\omega)$ is the complex phase of $S_{ki}(\omega)$, for $i=i_1, i_2, \ldots, i_{2p}$ $\phi R_{ji}(\omega)$ is the complex phase of $R_{ji}(\omega)$, for $i=i_1, i_2, \ldots, i_{2p}$

* denotes the conjugate operator, applied to $\phi S_{ki}(\omega)$ for $i=i_{2m}$ and to $\phi R_{ji}(\omega)$ for $i=i_{2m-1}$, m being an integer between 1 and p;

$S_{ki}(\omega)$ is the Fourier transform of $S_{ki}(t)$, $R_{ji}(\omega)$ is the Fourier transform of $r_{ji}(t)$, p is a non-zero natural integer less than or equal to $N_{SENS}/2$, $i_1, i_2, \ldots i_{2p}$ are 2p indices denoting 2p sensors, each between 1 and $N_{SENS}$.

2. Method according to claim 1, in which the reference signals are predetermined theoretically.

3. Method according to claim 2, in which the reference signals are used with said object without training phase.

4. Method according to claim 1, wherein the reference signals are previously learned on a reference device identical to said object, then are used with said object without training phase.

5. Method according to claim 1, including a step for calculating the intercorrelation $\text{PROD}_{kj}^{i_1 i_2 i_{2p}}(\omega)$, then a step for the inverse Fourier transform of this intercorrelation to obtain a time function $\text{prod}_{kj}^{i_1 i_2 i_{2p}}(t)$, from which said validation parameter is then calculated.

6. Method according to claim 5, in which the intercorrelation $\text{PROD}_{kj}^{i_1 i_2 i_{2p}}(\omega)$ is standardized before proceeding with the inverse Fourier transform.

7. Method according to claim 5, in which, for each reference point j, a resemblance function $V_{kj}(t)$ is calculated, chosen from: $\text{prod}_{kj}^{i_1 i_2 i_{2p}}(t)$, and a linear combination of a number of functions $\text{prod}_{kj}^{i_1 i_2 i_{2p}}(t)$ corresponding to a number of subsets of 2p sensors out of $N_{SENS}$.

8. Method according to claim 7, in which $N_{SENS}$ is an even number and $V_{kj}(t)$ is proportional to $\text{prod}_{kj}^{i_1 i_2 i_{2p}}(t)$, where $p=N_{SENS}/2$.

9. Method according to claim 8, in which $N_{SENS}=2$ and $V_{kj}(t)$ is proportional to $\text{prod}_{kj}^{12}(t)$.

10. Method according to claim 7, in which $N_{SENS}=3$ and, for each reference point j, a resemblance function $V_{kj}(t)$ is calculated, chosen from: $-V_{kj}(t)=a3\cdot[\text{prod}_{kj}^{12}(t)+\text{prod}_{kj}^{23}(t)]$, and $V_{kj}(t)=b3\cdot\{\text{prod}_{kj}^{12}(t)+\text{prod}_{kj}^{23}(t)+\text{prod}_{kj}^{13}(t)\}$, a3 and b3 being constants.

11. Method according to claim 10, in which $a3=\frac{1}{2}$ and $b3=\frac{1}{3}$.

12. Method according to claim 7, in which $N_{SENS}=4$ and, for each reference point j, a resemblance function $V_{kj}(t)$ is calculated, chosen from:

$V_{kj}(t)=a4\cdot\text{prod}_{kj}^{1234}(t)$, $V_{kj}(t)=b4\cdot[\text{prod}_{kj}^{12}(t)+\text{prod}_{kj}^{34}(t)]$, $V_{kj}(t)=c4\cdot[\text{prod}_{kj}^{12}(t)+\text{prod}_{kj}^{23}(t)+\text{prod}_{kj}^{34}(t)+\text{prod}_{kj}^{14}(t)]$, a4, b4 and c4 being constants.

13. Method according to claim 12, in which $a4=1$, $b4=\frac{1}{2}$ and $c4=\frac{1}{4}$.

14. Method according claim 7, in which the validation parameter is chosen from:

$$\text{MAXIMUM}_{0j} = |V_{kj}(t=0)|,$$

$$\text{MAXIMUM}_{1j} = \text{Max}(|V_{kj}(t)|),$$

$$\text{CONTRAST}_{1j} = \frac{\text{Max}(\text{MAXIMUM}_{0j})}{(\Sigma_j \text{MAXIMUM}_{1j} - \text{Max}(\text{MAXIMUM}_{1j}))/(N_{REF}-1)}$$

$$\text{ENERGY} = \Sigma_i(\Sigma_t[s_{ki}(t)]^2).$$

15. Method according to claim 14, in which only $V_{kj}(t)$ is calculated for the time $t=0$ roughly corresponding to the impact, as being the real part of $\text{PROD}_{kj}^{i_1 i_2 i_{2p}}(\omega)$, and $\text{MAXIMUM}_{0j}$ is used as validation parameter.

16. Method according to claim 14, in which at least one validation criterion is used, chosen from the following criteria:

$\text{CONTRAST}_{1j} > \text{THRESHOLD}_1$, with $\text{THRESHOLD}_1 > 1$, $\text{CONTRAST}_{1j} > \text{THRESHOLD}_1$ and $\text{MAXIMUM}_{0j}/\text{MAXIMUM}_{ij}^{NOISE} > \text{THRESHOLD}_2$, where $\text{THRESHOLD}_2 > 1$ and $\text{MAXIMUM}_{1j}^{NOISE}$ corresponds to the parameter $\text{MAXIMUM}_{1,J}$ of the signals processed previously and not having resulted in validation, $\text{MAXIMUM}_{0j} > \text{THRESHOLD}_3$, with $\text{THRESHOLD}_3 > 0$ and $\text{MAXIMUM}_{0j}/\text{MAXIMUM}_{0j}^{NOISE} > \text{THRESHOLD}_4$ with $\text{THRESHOLD}_4 > 1$, where $\text{MAXIMUM}_{0j}^{NOISE}$ corresponds to the parameter $\text{MAXIMUM}_{0j}$ of the signals processed previously and not having resulted in validation, $\text{MAXIMUM}_{0j}/\text{Average}(\text{MAXIMUM}_{0j}^{NOISE}) > \text{THRESHOLD}_5$, with $\text{THRESHOLD}_5 > 1$, $\text{ENERGY}/\text{ENERGY}^{NOISE} > \text{THRESHOLD}_6$, where $\text{THRESHOLD}_6 > 1$ and $\text{ENERGY}^{NOISE}$ corresponds to the parameter ENERGY of the signals processed previously and not having resulted in validation.

17. Device specially adapted to implement a method according to claim 1, this device comprising:

an object provided with at least $N_{SENS}$ acoustic sensors, $N_{SENS}$ being a natural integer at least equal to 2, to pick up respectively $N_{SENS}$ signals $s_{ki}(t)$ from acoustic waves generated in the object by an impact on a surface belonging to said object, i being an index between 1 and $N_{SENS}$ which denotes the corresponding sensor, a central processing unit linked to said acoustic sensors and able to calculate, for each reference point of index j, at least one validation parameter representative of at least one intercorrelation of complex phases representative of said picked up signals $S_{ki}(t)$ and of reference signals $r_{ji}(t)$, each reference signal $r_{ji}(t)$ corresponding to the signal that would be received by the sensor i in case of impact at a reference point j out of $N_{REF}$ reference points belonging to said surface, $N_{REF}$ being a natural integer at least equal to 1 and j being an index between 1 and $N_{REF}$, and locate the impact by determining at least one reference point as close as possible to the point of impact, by applying at least one validation criterion to the validation parameter, characterized in that said validation parameter is representative of at least one intercorrelation:

$$PROD_{kj}^{i_1 i_2 i_{2p}}(\omega) = \phi S_{ki1}(\omega)\phi R_{ji1}(\omega)^* \phi S_{ki2}(\omega)^* \phi R_{ji2}(\omega) \ldots \phi S_{ki2p}(\omega)^* \phi R_{ji2p}(\omega)$$

where:

$\phi S_{ki}(\omega)$ is the complex phase of $S_{ki}(\omega)$, for $i = i_1, i_2, \ldots, i_{2p}$, $\phi R_{ji}(\omega)$ is the complex phase of $R_{ji}(\omega)$, for $i = i_1, i_2, \ldots, i_{2p}$,

* denotes the conjugate operator, applied to $\phi S_{ki}(\omega)$ for $i = i_{2m}$ and to $\phi R_{ji}(\omega)$ for $i = i_{2m-1}$, m being an integer between 1 and p;

$S_{ki}(\omega)$ is the Fourier transform of $S_{ki}(t)$, $R_{ji}(\omega)$ is the Fourier transform of $r_{ji}(t)$, p is a non-zero natural integer less than or equal to $N_{SENS}/2$, $i_1, i_2, \ldots i_{2p}$ are 2p indices denoting 2p sensors, each between 1 and $N_{SENS}$.

* * * * *